(12) United States Patent
Kramlick (10) Patent No.: US 8,882,436 B2
(45) Date of Patent: Nov. 11, 2014

(54) ATV RAMP

(71) Applicant: Matthew Kramlick, Branchburg, NJ (US)

(72) Inventor: Matthew Kramlick, Branchburg, NJ (US)

( * ) Notice: Subject to any disclaimer, the term of this patent is extended or adjusted under 35 U.S.C. 154(b) by 109 days.

(21) Appl. No.: 13/771,360

(22) Filed: Feb. 20, 2013

(65) Prior Publication Data

US 2013/0223963 A1 Aug. 29, 2013

Related U.S. Application Data

(60) Provisional application No. 61/602,715, filed on Feb. 24, 2012.

(51) Int. Cl.
*B60P 1/43* (2006.01)

(52) U.S. Cl.
CPC ..................................... *B60P 1/431* (2013.01)
USPC ............................ 414/537; 414/477; 414/480

(58) Field of Classification Search
CPC ............ B06P 1/43; B06P 1/431; B06P 1/433; B06P 1/435; B06P 1/436
USPC .................................. 414/477, 480, 537, 462
See application file for complete search history.

(56) References Cited

U.S. PATENT DOCUMENTS

| | | | |
|---|---|---|---|
| 2,424,862 A * | 7/1947 | Stuart ............................ | 414/537 |
| 4,944,546 A | 7/1990 | Keller | |
| 4,990,049 A | 2/1991 | Hargrove | |
| 5,156,432 A | 10/1992 | McCleary | |
| 5,244,335 A | 9/1993 | Johns | |
| 5,253,410 A * | 10/1993 | Mortenson ....................... | 29/436 |
| 5,273,335 A | 12/1993 | Belnap et al. | |
| 5,340,267 A * | 8/1994 | Stoll et al. ...................... | 414/537 |
| 5,393,192 A * | 2/1995 | Hall et al. ...................... | 414/537 |
| 5,467,855 A * | 11/1995 | Sorensen .......................... | 193/5 |
| 5,472,306 A * | 12/1995 | Stoll et al. ...................... | 414/537 |
| 5,553,762 A | 9/1996 | Brown | |
| 5,795,125 A | 8/1998 | Walkden | |
| 5,829,947 A * | 11/1998 | Litten ........................... | 414/537 |
| 5,907,276 A | 5/1999 | Lance | |
| 5,938,397 A | 8/1999 | Schouest | |
| 5,988,725 A | 11/1999 | Cole | |
| 6,296,290 B1 | 10/2001 | Wolf | |
| 6,447,040 B1 | 9/2002 | Young, Sr. | |
| 6,533,337 B1 | 3/2003 | Harshman et al. | |
| 6,698,994 B2 * | 3/2004 | Barrett ........................... | 414/462 |
| 6,767,171 B2 * | 7/2004 | Kelly ............................. | 414/462 |
| 7,070,220 B1 | 7/2006 | Lantaigne | |
| 7,128,357 B1 | 10/2006 | Carroll | |
| 7,309,202 B1 | 12/2007 | Anderson | |
| 7,455,489 B1 | 11/2008 | Klev et al. | |
| 7,458,624 B1 | 12/2008 | Bower et al. | |
| 7,488,025 B1 | 2/2009 | Roberson | |
| 7,513,552 B2 | 4/2009 | Carvalho | |
| 7,533,923 B1 | 5/2009 | Caldwell | |
| 7,549,692 B2 | 6/2009 | Washington | |

(Continued)

*Primary Examiner* — Kaitlin Joerger (74) *Attorney, Agent, or Firm* — Gearhart Law, LLC (57) ABSTRACT

The current invention discloses a light and easy to use support ramp assembly to be attached on a pick up truck to extend the cargo bed area. The assembly has preferably two retractable ramps, each having a horizontal ramp table/housing unit and a loading ramp. The ramp table housing unit is partially supported by cargo bed and by an open tail gate and further support is provided by a support arm and optionally by an adjustable loading support. The assembly is adjustable for any pickup truck.

19 Claims, 4 Drawing Sheets

(56) References Cited

U.S. PATENT DOCUMENTS

| | | |
|---|---|---|
| 7,703,825 B2 | 4/2010 | Brown |
| 7,909,560 B1 | 3/2011 | Nespor |
| 7,966,685 B2 * | 6/2011 | Van Beek et al. ............... 14/71.1 |
| 8,215,893 B2 * | 7/2012 | Simpson ....................... 414/478 |
| 8,292,565 B1 * | 10/2012 | Ruff et al. ...................... 414/480 |
| 2002/0136621 A1 * | 9/2002 | Scherle ......................... 414/480 |
| 2003/0215316 A1 * | 11/2003 | Burney et al. ................. 414/537 |
| 2004/0022612 A1 * | 2/2004 | Kellogg et al. ................ 414/537 |
| 2006/0133915 A1 * | 6/2006 | Day ............................... 414/537 |
| 2007/0205632 A1 * | 9/2007 | Faulkiner .................... 296/183.1 |
| 2008/0014068 A1 | 1/2008 | Smith |
| 2008/0159838 A1 * | 7/2008 | Sherer ........................... 414/537 |
| 2011/0202199 A1 | 8/2011 | Crane |
| 2011/0298238 A1 * | 12/2011 | Webb ........................ 296/26.11 |
| 2012/0009050 A1 * | 1/2012 | Pepin ............................ 414/537 |
| 2013/0045069 A1 * | 2/2013 | Day ............................... 414/537 |

* cited by examiner

ATV RAMP

CLAIM OF PRIORITY

This application claims priority of U.S. provisional application No. 61/602,715 filed on Feb. 24, 2012, the contents of which are incorporated herein by reference in its entirety.

FIELD OF THE INVENTION

The invention relates to a set of ramp structures that may serve as a loading aid and an extender for pick-up trucks. In particular, this invention relates to ramp structures that may serve to extend the length of the cargo bed of a pick-up truck and facilitate loading and transporting all terrain vehicles.

BACKGROUND OF THE INVENTION

Pick-up trucks are widely used in the United States, mainly for transporting or hauling of building materials, goods, and sometimes entertaining vehicles such as boats or all terrain vehicles (ATVs). There are many types of pick-up trucks, ranging from compact trucks to so-called full-size pick-up trucks in terms of dimensions and carrying capacities. In general, it is not easy to load a pickup truck because the goods need to be lifted before being positioned in the cargo area of the truck. When the goods are heavy, it would be almost impossible to lift them without additional equipment.

To facilitate the loading of goods, many kinds of removable or attachable ramps and slopes have been developed. In these designs, generally the ramp will be formed with one end of the ramp being positioned on the edge of the truck cargo area and the other end of the ramp abutting the ground. Then the goods may be pushed or trolleyed on the ramp from ground level to the cargo area of the truck. The following patents may serve as examples for the general ramp designs:

U.S. Pat. No. 5,273,335 discloses a combination ramp and tailgate structure for installation and use in pickup trucks in which the structure would replace a conventional tailgate. The ramp/tailgate structure includes first, second, third and fourth generally rectangular frame member, the first and second of which are slidably coupled together to move between a nested or collapsed position and an extended position, and a third an fourth of which are likewise slidably coupled together to move between a nested or collapsed position and an extended position. The slidable movement between frame members is in the planes thereof so that a low profile, compact configuration may be maintained when in the collapsed position, yet allowing sufficient thickness of the members to permit the ramp to support heavy loads. When the frame members are in nested positions and the when the third frame member is pivoted into a position parallel with the second frame member, the frame members may be pivoted as a unit to an upright position to serve as a conventional tailgate. When the frame members are moved respectively to their extended positions and when the third frame member is pivoted so that all frame members are generally parallel in the same place, with a rearward side or edge of the fourth frame member in contact with the ground, the ramp/tailgate serves as a ramp extending from the ground to the bed of the pickup truck.

U.S. Pat. No. 5,244,335 discloses a telescopic tailgate ramp having a base tray and a series of telescopically-connected trays that are slidable with respect to one another and are stackable to replace a tailgate of a vehicle. Each tray is a plate with end pieces on each side that engage the end pieces of a preceding or succeeding tray. The end pieces have a channel and a tenon-like portion that engage a corresponding tenon or channel portion of a preceding or succeeding tray. Each plate has a corrugated surface for enhancing traction. The trays are prevented from being fully withdrawn from one another due to the placement of pins in corresponding channels and the tenons that engage each other. The trays succeeding the base tray are prevented from sliding past the rear portion of a preceding tray or the rear portion of the base tray securing an obstruction over the rear portion of each channel. The base tray holds the other trays and is pivotable within the tailgate frame of a vehicle upon which it is mounted. The base tray is also pivotable about an axis through points on support bars that are attached to the base tray. Handles facilitate movement and the manipulation of the ramp in general and the individual tray section.

Another problem that is widely encountered by users of pick-up trucks is that the exterior cargo area—the cargo "bed"—is not spacious enough to accommodate the goods that are being transported. In particular, the most likely scenario is that the cargo bed is not long enough—the length of the bed from back of the truck cab to the tailgate is not sufficient—to hold certain articles. For example, one likely use of a pick-up truck is to transport ATVs. However, while the length of the cargo bed for a full-size pick-up truck generally ranges from 90 to 100 inches (229 to 254 cm), a typical ATV usually has a length of about 65-75 inches (165 to 190 cm). Therefore, the cargo bed of a full-size pick-up truck is more than enough for a single ATV, but not enough for two, while the capacity to transport two ATVs may be crucial for the economical planning of sports activities or utility usages with ATVs. Here, the transport of ATV serves only as an example. Enhancing the capacity to carry more goods is desirable without attenuating safety precautions.

To address the issue of carrying capacities, some patents have aimed at providing an extender to the cargo bed of a pickup truck. The following patent is an example of such designs:

U.S. Pat. No. 7,703,825 discloses an extender for a bed of a truck, wherein the extender comprises a frame that has front end, a rear end and side. At least one, and preferably two, spaced apart connector brackets extend outwardly away from the rear end of the frame. The connector brackets are designed to rest upon an end portion of the truck bed when the truck's tailgate has been removed. The connector brackets are preferably bolted into the truck bed, but may be frictionally engaged therewith. A strut extends downwardly from the frame and is connected to a rearward extending longitudinal support. The support is secured to the truck's trailer hitch. The extender is therefore supported by both the connector brackets and the hitch. The length of the strut is vertically adjustable to allow the extender to be secured to any type of truck. The longitudinal support is also slidably adjustable onto the trailer hitch to provide for the extender to be secured to any type of truck. The frame preferably is formed with a pair of spaced-apart wheel wells so as to receive a pair of wheels of a vehicle loaded onto the truck bed. The frame may be provided with a pair of ramps to assist in loading of the truck and with an extended hitch to allow a trailer to be connected to the truck.

In addition, some patents teach structural modifications of the cargo bed and/or the tailgate to a ramp/extender combination. The following patent serves as an example:

U.S. Pat. No. 7,309,202 discloses a system for transporting and storing a portable combination table/ramp device in a truck bed, including a substantially flat platform supported by a plurality of support members positioned between the platform and the truck bed and defining a plurality of elongated recesses therebetween. Elongated table top portion and elongated bench seat portions with tailgate-engaging portions connected thereto are received in the recesses. A plurality of retractable table leg assemblies are connected to the table top portion. A connector is coupled to each respective table leg assembly for connecting the elongated bench seat portion thereto. Each respective table leg assembly is retractable to a storage position substantially adjacent the elongated table top portion and extendable to a deployed position extending between the table top portion and the ground.

While the ramp designs and the extender designs address only part of the problem, the prior art ramp/extender combinations tend to employ complicated structures that are difficult to make and to operate. Not only may the complication add to cost as to manufacturing and implementation, it may also increase the chances of accidents due to the failure of operation. The current invention discloses ramp structures that may serve as extenders for the truck cargo bed. The structure disclosed in the current invention is distinctive and simple and it addresses the problems raised above with a cost-effective design. In conclusion, various implements are known in the art, but their structures are distinctively different from the current invention. Moreover, the prior art fails to address all of the problems solved by the invention described herein. One embodiment of this invention is illustrated in the accompanying drawings and will be described in more detail herein below.

SUMMARY OF THE INVENTION

Disclosed is a support ramp assembly for loading and transporting vehicles on a pickup truck, said assembly comprising: two parallel retractable ramps; a support arm; and an adjustable loading support; the retractable ramps comprising a horizontal ramp table/housing unit and a loading ramp; said ramp table/housing unit comprising a front end and a rear end, the front end resting on cargo bed and on open tail gate of the pickup truck; the loading ramps being pivotably attached to the rear ends of the ramp table/housing units and leaning on the rear ends in an angle; the support arm comprising a horizontal support bar and a pivotable support bar, said horizontal bar having a first end and a second end, and the first end of the horizontal bar being attached to a receiver connected to pickup truck's frame; the pivotable support bar having a first and a second end, the first end of the pivotable support bar being connected to the second end of the horizontal bar through an adjustable pivot point, and the second end of the pivotable support bar being removably attached to a rear support bar, said rear support bar locating under the ramp table/housing units and being removably attached to them, and said rear support bar comprising lights and blinkers; the support ramp assembly further having a turn buckle, said turn buckle having a first end and a second end, said first end of the turn buckle being attached to the horizontal support bar and the second end being removably attached to the rear support bar; said turn buckle being capable of being elongated or shortened, whereby the rear bar is lowered or lifted and the height of the ramp table is adjusted for the front end to rest on the cargo bed and the open tail gate; the adjustable loading support comprising a U-bar housing attached to the pivotable support bar and a pivotable bar; said pivotable bar having a first solid end attached to the U-bar housing through a pivot point, a second hollow end and at least one hole; said pivotable bar slidably housing an extendable support bar having a foot and at least one hole to secure the extendable support bar through a selected hole to the second end of the pivotable bar; and the ramp table/housing units each being supported by a support strap, said straps being attached to the ramp table/housing units and to truck wall.

It is an object of the present invention to provide a retractable support ramp assembly for increasing the cargo bed area of a pickup truck.

It is a further object of the present invention to provide a retractable support ramp assembly for extending the cargo bed area of a pick up truck to fit two ATV-vehicles one behind another.

It is another object of the present invention to provide a retractable support ramp assembly that comprises a horizontal area and a loading ramp.

Yet another object of the present invention is to provide a retractable support ramp assembly that can be easily assembled and disassembled.

Still another object of the present invention is to provide a retractable support ramp assembly that can be adjusted by its height to fit on any pickup truck.

Yet another object of the present invention is to provide a retractable support ramp assembly that is light and easy to handle but sturdy enough to carry a heavy load.

Another object of the present invention is to provide a retractable support ramp assembly that is supported from below to enable loading and transportation of heavy ATV-vehicles.

DESCRIPTION OF THE PREFERRED EMBODIMENTS

The preferred embodiments of the present invention will now be described with reference to the drawings. Identical elements in the various figures are identified with the same reference numerals.

Reference will now be made in detail to embodiments of the present invention. Such embodiments are provided by way of explanation of the present invention which is not intended to be limited thereto. In fact, those of ordinary skill in the art may appreciate upon reading the present specification and viewing the present drawings that various modifications and variations can be made thereto without diverting from the spirit of this invention.

Figure 1:
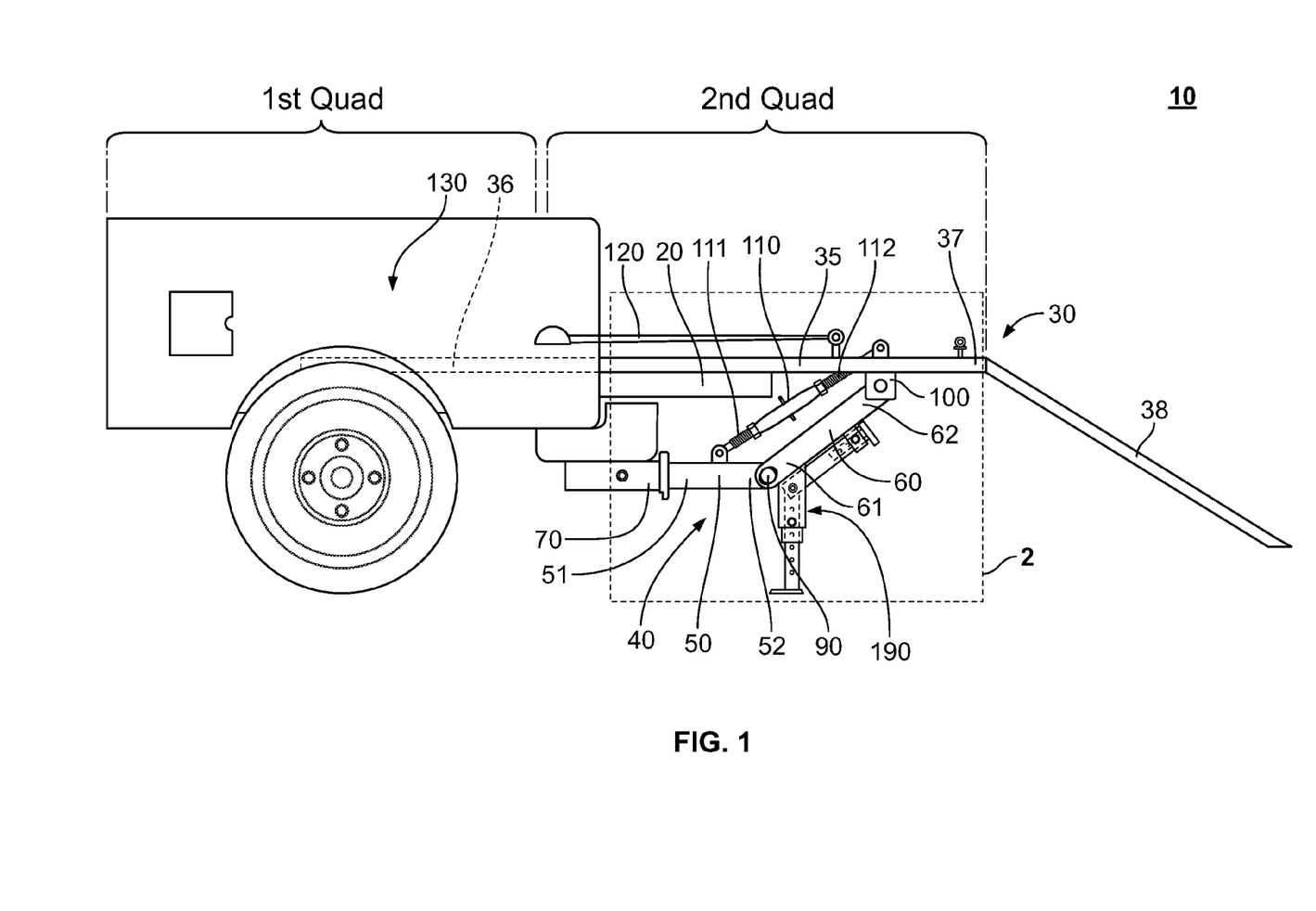
FIG. 1 is a side view of the retractable support ramp assembly ready to be used for loading and transporting the ATV-vehicles (quads).
Figure 2:
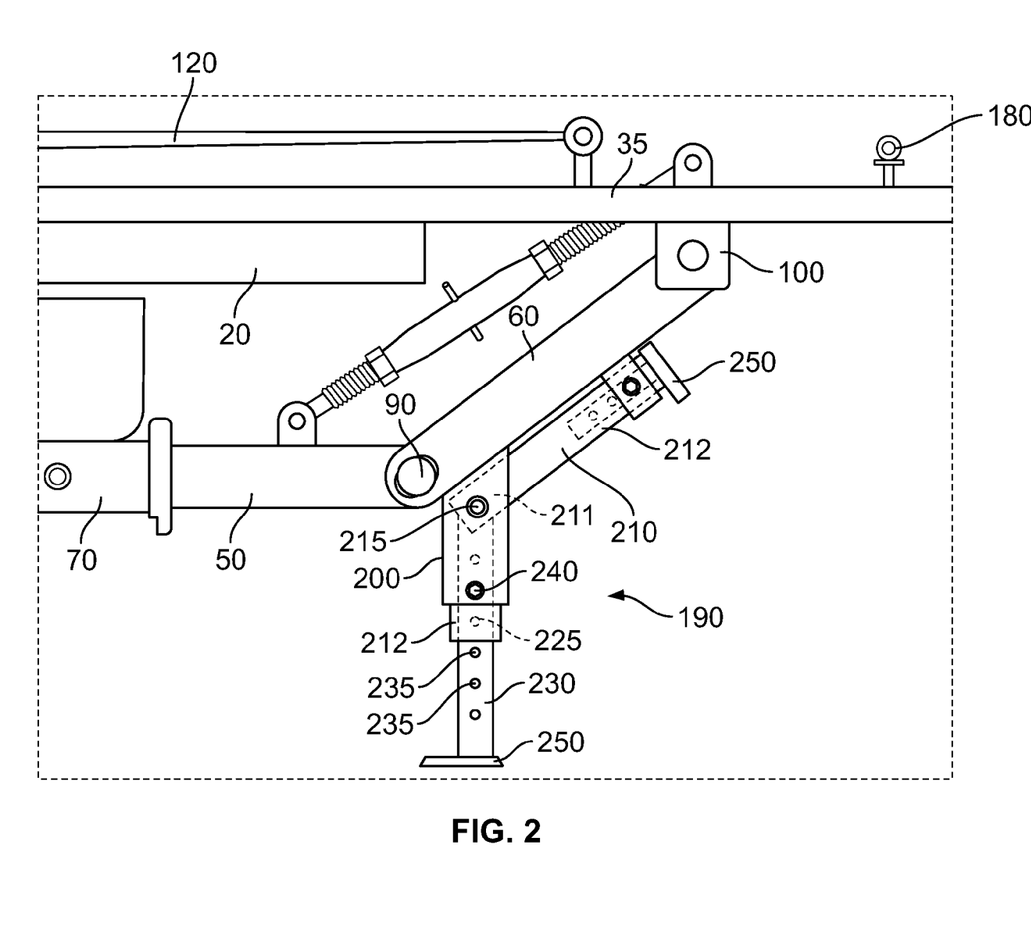
FIG. 2. is a detailed view of the support mechanism according to one preferred embodiment.
Figure 4:
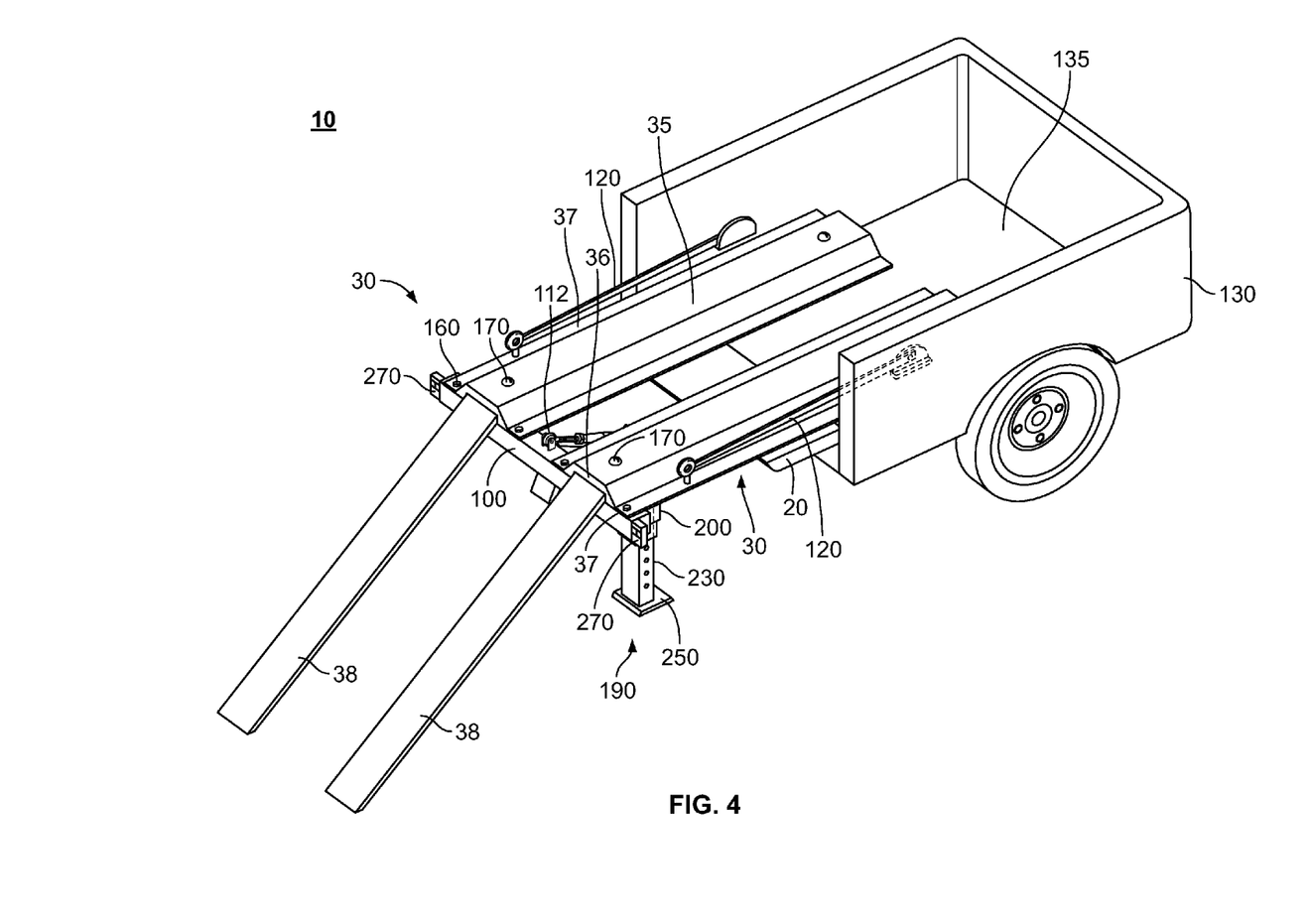
FIG. 4. is a perspective view of the retractable support ramp assembly.

The invention is now described by referring to FIGS. 1 and 2. FIG. 1 is a side elevational view of the support ramp assembly 10 for a pickup truck showing the tailgate 20 of the pickup truck in opened position and the support ramp assembly 10 being in extended position ready to be used. FIG. 2 is a close up of the support system according to one preferred embodiment of the invention. The support ramp assembly 10 comprises of at least one, preferably two parallel retractable ramps 30, each having a substantially horizontal ramp table/housing—unit 35 and a loading ramp 38. The ramp table/housing—units 35 have a dual use: they serve as ramp table to extend the cargo bed 135 (shown in FIG. 4), thereby allowing the truck to accommodate larger loads, for example two ATV-vehicles (quads), but they may also serve as housing for the loading ramps 38 when the support ramp assembly 10 is not in use. In the preferred embodiment where the assembly comprises two parallel retractable ramps 30 as shown in FIG. 4, the distance between the ramps preferably equals to the length of the axle of a standard ATV-vehicle, but the distance may also be adjustable to allow loading and transportation of vehicle with different axle widths. The ramp table/housing units 35 have a front end 36 and a rear end 37. The loading ramps 38 are preferably detachably attached to the rear ends 37 of the ramp table/housing—units 35. The attachment may be with pins, hooks or clamps but other means may also be used. The attachment allows the loading ramps 38 to lean on the ramp table/housing units 35 in a convenient angle to enable loading of a vehicle, such as an ATV vehicle, onto the truck cargo bed and onto the ramp table/housing—portion that extend the length of the truck cargo bed. The front ends 36 of the horizontal ramp table/housing—unit 35 rest on the opened tail gate 20 and on the cargo-bed 135, whereby the tailgate provides a partial support to the ramp table/housing units 35. The front ends 36 of the ramp table/housing units may be anchored to the cargo bed with security pins, hooks, clamps or the likes. The support ramp assembly 10 further comprises a support arm 40; said support arm comprises a horizontal support bar 50 and a pivotable support bar 60. The horizontal support bar has two ends 51, 52 and the pivotable support bar has two ends 61, 62. The first end 51 of the horizontal bar is attached to a receiver 70, said receiver being attached to the truck frame. The second end 52 of the horizontal bar is attached via an adjustable pivot point 90 to the first end 61 of the pivotable bar and the second end 62 of the pivotable arm is movably attached to a rear support bar 100. The rear support bar 100 locates under the ramp table/housing units 35 and is attached to both of the ramp table/housing units.

The support ramp assembly 10 further has a turn buckle 110 and said turn buckle has a first end 111 and a second end 112, and the first end 111 of the turn buckle is connected to the horizontal support bar 50 and the second end 112 of the turn buckle is connected to the rear support bar 100. The turn buckle 110 can be elongated or shortened. Elongating the turnbuckle 110 would lower the rear support bar 100 and accordingly lower the level of the ramp table/housing—units 35 so as to adjust the support ramp assembly 10 to be used with a smaller truck. Shortening the turnbuckle would respectively result in lifting the rear support bar 100 and accordingly lowering the ramp table/housing units so as to adjust to a bigger truck. The adjustable pivot point 90 connection between the horizontal support bar 50 and the pivotable support bar 60 allows the support arm 40 to adjust to the different levels of the rear support bar 100. The support ramp assembly 10 is further supported with preferably two support straps 120 attached to the horizontal ramp table/housing units 35 from one end and to the truck wall 130 from the other end.

According to one preferred embodiment, the support arm 40 is further supported in loading situation with an adjustable loading support 190. The adjustable loading support is depicted in details in FIG. 2. The adjustable loading support comprises a U-bar housing 200 preferably attached to the pivotable support bar 60. A pivotable bar 210 having a first end 211 and a second end 212 is pivotably attached from its first end 211 to the housing 200 through a pivot point 215. The first end 211 of the pivotable bar is preferably solid and the second end 212 is hollow and has at least one hole 225 and is slidably housing an extendable support bar 230. The extendable support bar 230 has one or more holes 235. The extendable support bar 230 is secured to the second end 212 of the pivotable bar with a pin 240 through the hole 225 and one of the holes 235. According to one preferred embodiment the U-bar housing 200 also comprises holes and the pin 240 secures the extendable support bar 230 through the holes in the U-bar housing 200, in the second end 212 of the pivotable bar and in the extendable support bar 230. The extendable support bar further has a foot 250.

Figure 3:
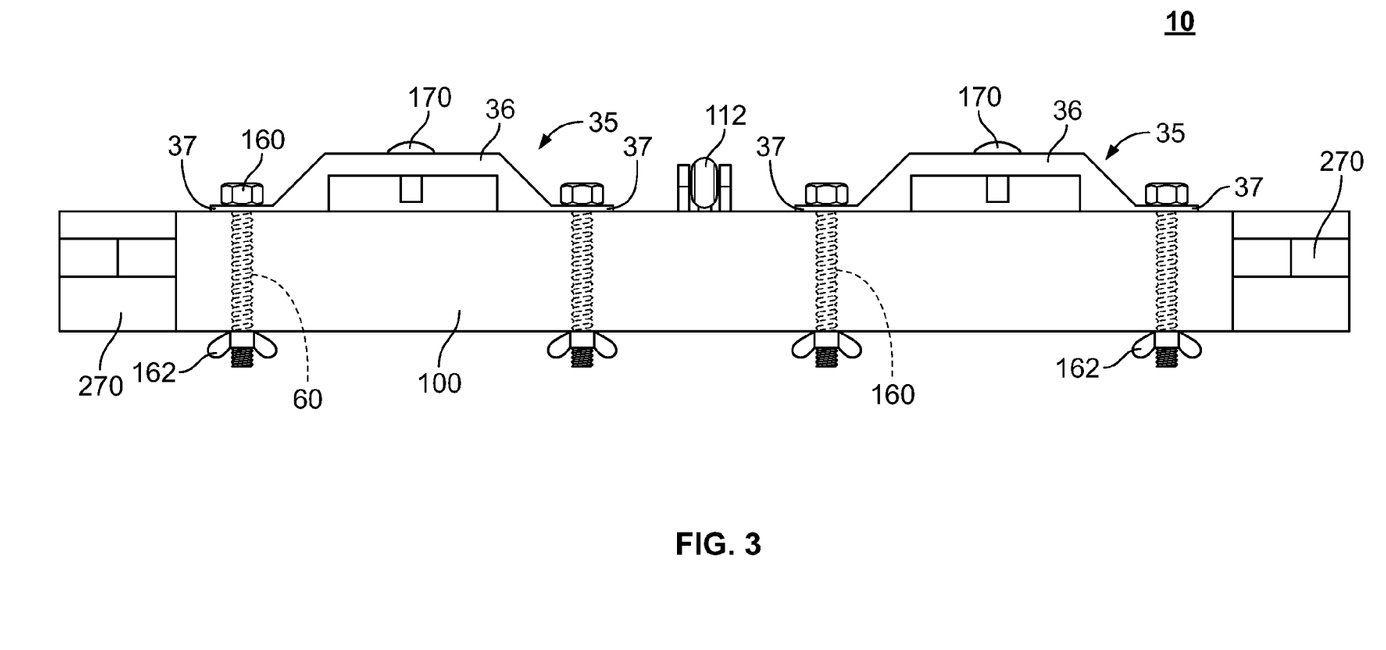
FIG. 3 is a back view of the retractable support ramp assembly without the loading ramp.

Referring now to FIG. 3, a back view of the retractable support ramp assembly 10 is shown without the loading ramps 38. The ramp table/housing units 35 have a flattened U-shape cross-section and have two longitudinal sides 37 and a top 36. The ramp table/housing units 35 are attached to the rear support bar 100 from the longitudinal sides 37. FIG. 3 shows an embodiment where the ramp table/housing units 35 are attached from their longitudinal sides 37 to the rear support bar 100 with bolt headed screws 160 and fasteners 162, but other kind of attaching mechanisms are also available and would fall under the scope of this invention. FIG. 3 shows an embodiment with security pins 170 through the top 36 of ramp table/housing-units. The security pins 170 may be used to attach the loading ramps 38. According to a preferred embodiment tail lights and blinkers 270 are attached to both ends of the rear support bar.

Now referring to FIG. 4, a perspective view of the invention is shown. FIG. 4 shows a preferred embodiment where the support ramp assembly 10 has two parallel rectractable ramps 30, each having a horizontal ramp table/housing unit 35 and a loading ramp 38. The table/housing units 35 are resting partially on the cargo bed 135 and partially on an open tailgate 20. The support ramp assembly 10 is in the loading position and the loading support 190 is in use.

When the ramp assembly of this invention is not used for transporting and holding vehicles, the retractable ramps 30 are easily pushed into the cargo bed area. The user first detaches the loading ramps 38 from the rear ends 37 of ramp table/housings 35. Then the rear support bar 100 is detached from the ramp table/housing units 35. In the embodiment where an adjustable loading support 190 is included the extandable support bar 230 is pushed inside the pivotable bar 210 and the pivotable bar 210 is pivoted toward the horizontal support bar 60 and secured to the securing holder 260 preferably with a pin 262. The ramp table/housing units 35 can now be pushed inside the cargo area and the loading ramps 38 may be inserted inside the ramp table/housings and secured inside by security pins 170.

According to a preferred embodiment the length of the ramp table/housing units 35 is such that when the ramp in extended position, the ramp tables would extend the cargo bed area to fit two ATV-vehicles. When the support ramp assembly 10 is extended the ATV-vehicles can be loaded on the truck with the help of the loading ramps 38. The first vehicle would fit on the cargo bed area of the truck having one pair of wheels on the cargo bed floor and another pair of wheels on the front end 36 of the ramp table/housing unit. The second vehicle would have one pair of wheels on the front end 36 of the ramp table/housing unit and another pair of wheel would be on the rear portion 37 of the ramp table/housing units. The second vehicle may be tied on one or more tie down hooks 180 locating on the ramp table/housing unit 35.

According to a preferred embodiment the length of the ramp table/housing units 35 is between 8 and 10 feet. The length of the ramps 38 is preferably between 5 and 6 feet and the width of the support bar 100 is preferably about 6 feet.

Although this invention has been described with a certain degree of particularity, it is to be understood that the present disclosure has been made only by way of illustration and that numerous changes in the details of construction and arrangement of parts may be resorted to without departing from the spirit and the scope of the invention.

What is claimed is:

1. A support ramp assembly for loading and transporting vehicles on a pickup truck, said assembly comprising:
    at least one retractable ramp;
    a support arm; and
    an optional adjustable loading support;
    the retractable ramp comprising a horizontal ramp table/housing unit and a loading ramp;
    said ramp table/housing unit comprising a front end and a rear end, the front end resting on cargo bed and on open tail gate of the pickup truck and optionally being secured to cargo bed;
    the loading ramp being pivotably attached to the rear end of the ramp table/housing unit and leaning on the rear end in an angle;
    the support arm comprising a horizontal support bar and a pivotable support bar,
    said horizontal bar having a first end and a second end, and the first end of the horizontal bar being attached to a receiver connected to pickup truck's frame;
    the pivotable support bar having a first and a second end, the first end of the pivotable support bar being connected to the second end of the horizontal bar through an adjustable pivot point, and the second end of the pivotable support bar being removably attached to a rear support bar, said rear support bar locating under the ramp table/housing units and being removably attached to them, and the rear support bar further comprising lights and blinkers;
    the support ramp assembly further having a turn buckle, said turn buckle having a first end and a second end, said first end of the turn buckle being attached to the horizontal support bar and the second end of the turn buckle being attached to the rear support bar;
    said turn buckle further being capable of being elongated or shortened, whereby the rear bar is lowered or lifted and the height of the ramp table is adjusted for the front end to rest on the cargo bed and on the tail gate;
    the optional adjustable loading support comprising a U-bar housing attached to the pivotable support bar and a pivotable bar; said pivotable bar having a first solid end attached to the U-bar housing through a pivot point, a second hollow end and at least one hole; said pivotable bar slidably housing an extendable support bar having a foot and at least one hole to secure the extendable support bar through a selected hole to the second end of the pivotable bar;
    the ramp table/housing unit being further supported by at least one strap, said strap being attached to the ramp table/housing unit and to truck wall.

2. The support ramp assembly of claim 1, wherein the assembly comprises two parallel retractable ramps.

3. The support ramp assembly of claim 2, wherein the loading ramps are detached when not in use.

4. The support ramp assembly of claim 2, wherein the ramp table/housing units are pushed to the cargo bed when not in use.

5. The support ramp assembly of claim 2, wherein the ramp table/housing units have a flattened U-shape cross section and comprise two longitudinal sides and a top, the top having a hole through which a security pin extend, the ramp table/housing unit being attached to the rear support bar from the longitudinal sides, and the loading ramps being detachably attached to the ramp table/housing units with the security pins.

6. The support ramp assembly of claim 2, wherein distance between the two parallel retractable ramps equals to a length of the axle of a standard ATV-vehicle.

7. The support ramp assembly of claim 2, wherein the width of the parallel retractable ramps is such that they accommodate the wheels of an ATV-vehicle.

8. The support ramp assembly of claim 2, wherein distance between the two parallel retractable ramps is adjustable.

9. The support ramp assembly of claim 2, wherein the length of the table ramps is such that a truck with extended support ramp assembly is capable of carrying two ATV-vehicles.

10. The support ramp assembly of claim 2, wherein the parallel retractable ramps are made of aluminum.

11. A support ramp assembly for loading and transporting two ATV-vehicles simultaneously on a pickup truck, said assembly comprising:
    two parallel retractable ramps;
    a support arm; and
    an adjustable loading support;
    the retractable ramps comprising a horizontal ramp table/housing unit and a loading ramp;
    said ramp table/housing unit comprising a front end and a rear end, the front end resting on cargo bed and on open tail gate of the pickup truck;
    the loading ramps being pivotably attached to the rear ends of the ramp table/housing units and leaning on the rear ends in an angle;
    the support arm comprising a horizontal support bar and a pivotable support bar,
    said horizontal bar having a first end and a second end, and the first end of the horizontal bar being attached to a receiver connected to pickup truck's frame;
    the pivotable support bar having a first and a second end, the first end of the pivotable support bar being connected to the second end of the horizontal bar through an adjustable pivot point, and the second end of the pivotable support bar being removably attached to a rear support bar, said rear support bar locating under the ramp table/housing units and being removably attached to them, and said rear support bar comprising lights and blinkers;
    the support ramp assembly further having a turn buckle, said turn buckle having a first end and a second end, said first end of the turn buckle being attached to the horizontal support bar and the second end being removably attached to the rear support bar;
    said turn buckle being capable of being elongated or shortened, whereby the rear bar is lowered or lifted and the height of the ramp table is adjusted for the front end to rest on the cargo bed and the open tail gate;
    the adjustable loading support comprising a U-bar housing attached to the pivotable support bar and a pivotable bar; said pivotable bar having a first solid end attached to the U-bar housing through a pivot point, a second hollow end and at least one hole; said pivotable bar slidably housing an extendable support bar having a foot and at least one hole to secure the extendable support bar through a selected hole to the second end of the pivotable bar; and
    the ramp table/housing units each being supported by a support strap, said straps being attached to the ramp table/housing units and to truck wall.

12. The support ramp assembly of claim 11, wherein the loading ramps are detached when not in use.

13. The support ramp assembly of claim 11, wherein the ramp table/housing units are pushed to the cargo bed when not in use.

14. The support ramp assembly of claim 11, wherein the ramp table/housing units have a flattened U-shape cross section and comprise two longitudinal sides and a top, the top having a hole through which a security pin extend, the ramp table/housing unit being attached to the rear support bar from the longitudinal sides, and the loading ramps being detachably attached to the ramp table/housing units with the security pins.

15. The support ramp assembly of claim 11, wherein distance between the two parallel retractable ramps equals to a length of the axle of a standard ATV-vehicle.

16. The support ramp assembly of claim 11, wherein the width of the parallel retractable ramps is such that they accommodate the wheels of an ATV-vehicle.

17. The support ramp assembly of claim 11, wherein distance between the two parallel retractable ramps is adjustable.

18. The support ramp assembly of claim 11, wherein the length of the table ramps is such that a truck with extended support ramp assembly is capable of carrying two ATV-vehicles.

19. The support ramp assembly of claim 11, wherein the parallel retractable ramps are made of aluminum.

\* \* \* \* \*